United States Patent [19]

Keshavan et al.

[11] Patent Number: 5,051,112
[45] Date of Patent: Sep. 24, 1991

[54] HARD FACING

[75] Inventors: Madapusi K. Keshavan, Fullerton; Proserfina C. Rey, Laguna Beach, both of Calif.

[73] Assignee: Smith International, Inc., Houston, Tex.

[21] Appl. No.: 501,421

[22] Filed: Mar. 28, 1990

Related U.S. Application Data

[63] Continuation of Ser. No. 212,867, Jun. 29, 1988, abandoned.

[51] Int. Cl.$^5$ .............................................. B24D 3/02
[52] U.S. Cl. .......................................... 51/309; 51/298
[58] Field of Search .................................. 51/309, 298

[56] References Cited

U.S. PATENT DOCUMENTS

| | | | |
|---|---|---|---|
| 2,180,813 | 11/1939 | Marvin | 75/302 |
| 2,833,638 | 5/1958 | Owen | 51/309 |
| 3,109,917 | 11/1963 | Schmidt | 219/76.14 |
| 3,768,984 | 10/1973 | Foster | 428/554 |
| 3,790,353 | 2/1974 | Jackson et al. | 51/309 |
| 4,481,016 | 11/1984 | Campbell et al. | 51/309 |
| 4,604,106 | 8/1986 | Hall et al. | 51/309 |
| 4,682,987 | 7/1987 | Brady et al. | 51/309 |
| 4,694,918 | 9/1987 | Hall | 51/309 |
| 4,726,432 | 2/1988 | Scott et al. | 175/375 |

Primary Examiner—William R. Dixon, Jr.
Assistant Examiner—Willie J. Thompson
Attorney, Agent, or Firm—Christie, Parker & Hale

[57] ABSTRACT

A hard facing rod is made by mixing particles of tungsten carbide, particles of a metal binder, and a temporary organic binder. The mixture is pressed, preferably by extrusion, into the form of a rod. The organic binder is removed and the rod is heated to a sufficient temperature to sinter the metal particles together without melting so that the rod has a residual porosity in the range of from 5 to 20%. Such a rod is used for hard facing a metal surface in lieu of conventional tube-rods. The technique permits a high proportion of tungsten carbide relative to the metal matrix and provides uniform distribution of carbide particles in the hard facing.

9 Claims, 5 Drawing Sheets

*PRIOR ART MATERIAL*

*PRIOR ART MATERIAL*

HARD FACING

CROSS-REFERENCE TO RELATED APPLICATIONS

This is a continuation of application Ser. No. 07/212,867, filed June 29, 1988 abandoned.

BACKGROUND OF THE INVENTION

This invention relates to a rod of wear-resistant hard facing for application to wear or cutting surfaces such as teeth on bits for drilling oil wells or the like. A new rod and a method for manufacturing such rods are described.

Bits for drilling oil wells and other products often have a steel body which is dressed or coated with a layer of hard facing material to resist wear or provide a cutting surface which abrades rock. Conventional hard facing usually comprises particles of tungsten carbide bonded to the steel by a metal alloy. In effect, the carbide particles are suspended in a matrix of metal forming a layer on the surface. Most hard facing on rock bits employs steel as the matrix, although other "brazing" alloys may also be used.

It is quite common in referring to the material in the hard facing merely as "carbide" without characterizing it as tungsten carbide, the metal carbide principally used in hard facing. Small amounts of tantalum carbide and titanium carbide (TIC/TAC) may be present along with the tungsten carbide. It will be understood that as used herein, reference merely to "carbide" means tungsten carbide, with or without small amounts of TIC/TAC.

A typical technique for applying hard facing to the steel surface is by oxyacetylene or atomic hydrogen welding. A welding rod or stick is formed of a tube of mild steel sheet enclosing a filler which is primarily carbide particles. The filler may also include deoxidizer for the steel, flux and a resin binder. When using such a tube-rod, the deoxidizer alloys with the mild steel of the tube to form an alloy steel matrix. It has been desirable to use TIG welding for applying hard facing, but that has not been feasible with existing materials.

Welding rods are also made by melting the binder metal in a graphite mold along with the carbide particles to make a "cast" product. Alloy steel or brazing alloy binders may be used.

The hard facing is applied by melting an end of the rod on the surface to be hard faced. The steel tube or cast matrix melts to weld or braze to the steel substrate and provide the matrix for the carbide particles.

Three types of tungsten carbide have been employed for hard facing. Possibly the most common is crushed cast carbide. Tungsten forms two carbides. WC and $W_2C$ and there can be an essentially continuous range of compositions therebetween. Cast carbide is typically a eutectic mixture of the WC and $W_2C$ compounds, and as such is substoichiometric, that is, it has less carbon than the more desirable WC form of tungsten carbide. Cast carbide is frozen from the molten state and comminuted to the desired particle size.

Another type of tungsten carbide is so-called macrocrystalline tungsten carbide. This material is essentially stoichiometric WC in the form of single crystals. Most of the macrocrystalline tungsten carbide is in the form of single crystals. When larger particle sizes are examined, it is found that some bicrystals of WC are formed. Macrocrystalline WC is desirable for its toughness and stability.

The third type of tungsten carbide used in hard facing comprises cemented tungsten carbide, sometimes referred to as sintered tungsten carbide. Cemented tungsten carbide comprises small particles of tungsten carbide (e.g., 1 to 15 microns) bonded together with cobalt. Cemented tungsten carbide is made by mixing tungsten carbide and cobalt powders, pressing the mixed powders to form a green compact, and "sintering" the composite at temperatures near the melting point of cobalt. The matrix melts and wets the surfaces of the tungsten carbide particles to form a composite with little if any void space. The resulting dense cemented carbide can then be comminuted to form particles of cemented tungsten carbide for use in hard facing.

Although widely used, tube-rods have certain shortcomings. The tube-rod is made by forming a tube around a powder mixture and periodically cutting the tube and crimping its ends to retain the powder mixture in place. Thermoset binder resin may also be employed for retaining the granular mixture. This is not always satisfactory and some of the hard facing product may sift out of the ends of the tube. Further, when welding, the crimped end of the tube is melted and some of the granular mixture may come out unevenly.

For such reasons, and since the tube-rod is inherently nonhomogeneous, there is often a nonuniform distribution of carbide particles in the matrix melted onto the surface. Such nonuniformity can result in erratic wear resistance. Further, the steel of the tube may not mix uniformly with the alloying ingredients in the powder within the tube, and the composition of the matrix may be nonuniform. The range of alloys available for the matrix is limited by the availability of sheet alloys for forming the tubes. Generally speaking, it is necessary to employ mild steel sheet for the tubing and try to obtain alloying by powders included with the carbide inside the tube.

Welding rods for hard facing which are made by casting the binder with the carbide particles have a different range of problems. The high temperatures of casting result in dissolution of some of the carbide in the matrix. This changes the composition of the matrix and erodes the carbide particles. The high carbon content of the matrix may be particularly troublesome since it embrittles the matrix.

It has recently been found that it is desirable to enhance the quantity of carbide relative to the binder or matrix for enhanced wear resistance in some applications. There are limits to the amount of carbide that can be applied by way of a tube since there are certain minimum thicknesses of sheet that can be used for making the tube and still maintain integrity of the tube.

It is, therefore, desirable to provide a welding rod for hard facing which can have any desired alloy composition of the matrix for the carbide particles and which can deposit the carbide particles uniformly throughout the matrix. It is desirable that the welding rod be manufactured without the costly rolls and rolling equipment required for making tube-rod. It is desirable to provide a hard facing having higher carbide content and lower matrix content than readily available with tube-rod.

BRIEF SUMMARY OF THE INVENTION

There is, therefore, provided in practice of this invention according to a presently preferred embodiment, a rod for applying hard facing to a surface, comprising particles of tungsten carbide and a matrix of metal particles sufficiently sintered together to bind the tungsten carbide particles into a rigid rod, but sintered at less than the melting temperature of the metal. There is typically from 5 to 20% residual porosity in such a rod.

Preferably such a hard facing rod is made by mixing particles of tungsten carbide, particles of metal binder, and a temporary organic binder and pressing or extruding the mixture into the form of a rod. The rod is then heated to remove the organic binder and sinter the metal binder particles together without melting.

A rock bit for drilling oil wells is desirably made with teeth hard faced by use of such a rod. This enables the concentration of carbide to be higher than reasonably available with tube-rod, and a uniform distribution of carbide in the matrix welded to the teeth on the rock bit enhances wear resistance.

Surprisingly, it is also found that the new rod can be used for application of hard facing by TIG (tungsten inert gas) welding whereas the former tube-rod could not without undue solution of carbide particles. TIG welding is desirable since better quality welding is possible, and the technique can be more easily automated.

BRIEF DESCRIPTION OF THE DRAWINGS

These and other features and advantages of the present invention will be appreciated as the same becomes better understood by reference to the following detailed description when considered in connection with the accompanying drawings wherein.

DETAILED DESCRIPTION

Figure 1:
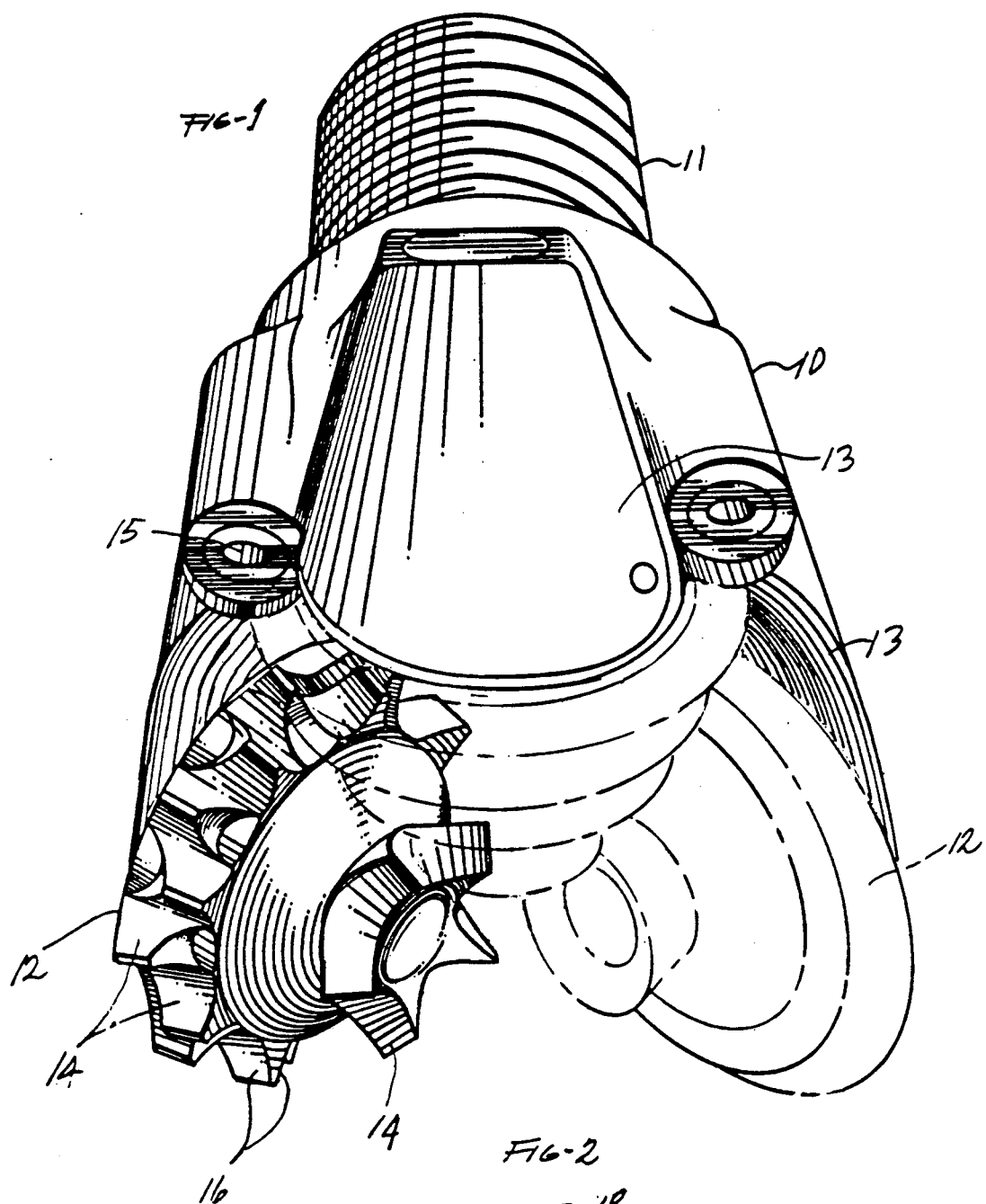
FIG. 1 is a perspective view of a milled tooth rock bit hard faced with a welding rod constructed according to principles of this invention.
Figure 2:
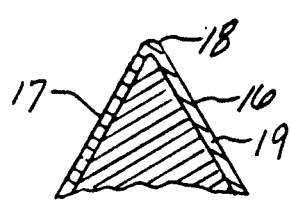
FIG. 2 is a fragmentary cross section of an exemplary tooth on such a rock bit.
Figure 3:
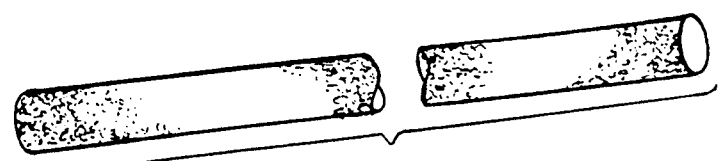
FIG. 3 is an isometric view of an extruded hard facing rod.

An exemplary milled tooth rock bit comprises a stout steel body 10 having a threaded pin 11 at one end for connection to a conventional drill string. At the opposite end of the body there are three cutter cones 12 for drilling rock for forming an oil well or the like. Each of the cutter cones is rotatably mounted on a pin (hidden) extending diagonally inwardly on one of the three legs 13 extending downwardly from the body of the rock bit.

As the rock bit is rotated by the drill string to which it is attached, the cutter cones effectively roll on the bottom of the hole being drilled. The cones are shaped and mounted so that as they roll, teeth 14 on the cones gouge, chip, crush, abrade, and/or erode the rock at the bottom of the hole. Fluid nozzles 15 direct drilling mud into the hole to carry away the particles of rock created by the drilling.

Such a rock bit is conventional and merely typical of various arrangements that may be employed in a rock bit. For example, most rock bits are of the three cone variety illustrated. However, one, two and four cone bits are also known. The arrangement of teeth on the cones is just one of many possible variations. A broad variety of tooth and cone geometries are known and do not form a specific part of this invention.

Exemplary teeth on such a cone are generally triangular in a cross-section taken in a radial plane of the cone. Such a tooth has a leading flank 16 and trailing flank 17 meeting in an elongated crest 18. The flanks of the teeth are covered with a hard facing layer 19. Sometimes only the leading face of each tooth is covered with a hard facing layer so that differential erosion between the wear-resistant hard facing on the front flank of a tooth and the less wear-resistant steel on the trailing face of the tooth tends to keep the crest of the tooth relatively sharp for enhanced penetration of the rock being drilled.

Such structure of a milled tooth rock bit is well known and does not form a specific portion of this invention, which relates to the hard facing material employed for obtaining a high proportion of carbide uniformly distributed in the metal matrix on the teeth of a milled tooth cutter cone.

Hard facing is applied to the teeth and gage surface by welding with a rod in the form of a uniform mixture of particles of tungsten carbide and particles of matrix metal sintered together enough to form a rigid rod with some strength, but not completely sintered; that is, the rod has some remaining porosity.

The hard facing material has been applied to the faces of the tooth by heating the face to a welding temperature by an oxyacetylene or atomic hydrogen torch. When a suitable temperature is reached, the matrix metal in the welding rod is melted onto the face of the tooth. In an exemplary embodiment, the thickness of the hard facing layer is about 1.6 to 2.4mm.

The welding rod is made by mixing the desired tungsten carbide particles with particles of metal to form the matrix for the hard facing, a temporary organic binder and, if desired, a solvent for the binder. These materials are vigorously mixed so that the individual particles each receive a coating of binder. The solvent, if any, can then be evaporated.

The particle mixture is placed in a conventional extruder where it is pressed through a circular orifice of an extruder die. The extruded material is in the form of a coherent "green" rod which is cut to desired lengths. The green rod is rather weak since the particles are only held together by the organic binder.

Such rods are laid on graphite trays and heated in a vacuum furnace. The initial heating causes vaporization of the binder which condenses on cooler portions of the furnace and may be recovered. The rods are held at a maximum temperature for a sufficient period for the metal particles to sinter or diffusion bond together to form a metal matrix with sufficient strength to retain the tungsten carbide particles and not break during handling.

The maximum sintering temperature is below the melting temperature of the metal or any alloys it may form with the tungsten carbide. By remaining well below the melting temperature, the sintered product does not achieve 100% of theoretical density. That is, the product retains some porosity. A porosity in the range of from about 5 to 20% is preferred. The porosity is not a desideratum per se, although it does permit outgassing during welding. It is instead a consequence of avoiding melting of the matrix metal during sintering. The technique for making the welding rods is analogous to the technique for making cemented tungsten carbide rods, except that the maximum temperature is not so close to the melting temperature of the matrix that consolidation to nearly 100% of theoretical density occurs.

It is important to avoid melting of the matrix since this may cause alloying between the matrix metal and the tungsten carbide particles. This is particularly true when the matrix metal is steel which has a strong affinity for the carbide. Such alloying reduces the quantity of carbide left in the rod for forming a hard facing and reduces the toughness of the matrix. Thus it is preferred to sinter the rod only enough to provide strength for handling preparatory to using the welding rod. The residual porosity is in the range of from 5 to 20%.

As previously mentioned, there are many types of tungsten carbide particles available for use in practice of this invention. Thus the carbide particles in the welding rod may be cemented tungsten carbide (WC cemented with cobalt, for example), macrocrystalline tungsten carbide, WC particles, or cast carbide. It can be desirable to employ "spherical" cast carbide particles and cemented carbide pellets for wear resistant hard facing. When the green mixture of particles is extruded through a die, the tungsten carbide particles tend to scratch and erode the die. Spherical particles cause less of such abrasion and less die wear.

For hard facing rock bit teeth, high melting point, hard, wear resistant matrix metals are preferred. Steel is particularly preferred for alloying with the steel substrate of the teeth for maximum resistance to chipping or spalling. The matrix powder may be plain carbon steel or any of a broad variety of alloy steels. Such alloys can be formed by mixing powders of different composition although it is preferred to employ alloy powders. Virtually any alloy can be atomized to form spherical particles of uniform size appropriate for use in practice of this invention. Many such alloys are commercially available.

Alternatively high melting point brazing alloys may be employed. For example, the American Welding Society BNi series of nickel base alloy filler metals having brazing temperatures from about 900 to 1,200° C. are particularly suitable.

A suitable composition comprises plain carbon steel particles commingled with about 4% of deoxidizer or "flux". A suitable deoxidizer is silico-manganese obtained from Kennametal, Inc., Fallon, Nev. The nominal composition of the silico-manganese is 65 to 68% manganese, 15 to 18% silicon, a maximum of 2% carbon, a maximum of 0.05 sulfur, a maximum of 0.35 phosphorous, and a balance of iron. Upon melting the welding rod the silico-manganese alloys with the plain carbon steel to form an alloy steel. Sintering of such a rod is at a temperature less than the eutectic temperature of a manganese/silicon/iron alloy.

It is desirable for obtaining a high density of carbide in the metal matrix, to employ a mixture of particle sizes for high packing density. Two or three sizes of particles may be mixed together. The mixture may comprise particles of a single type of carbide or may be of different types. For example, a mixture of relatively larger particles of cemented tungsten carbide and relatively smaller particles of single crystalline monotungsten carbide can provide excellent wear resistance on the teeth of a rock bit.

An exemplary composition for hard facing teeth on a rock bit employs as one type of carbide, 20 to 30 mesh cemented tungsten carbide. The grain size of the tungsten carbide grains in the particles of cemented tungsten carbide are in the range of from about one to fifteen microns. The binder content in such a cemented tungsten carbide is preferably cobalt in the range of from 6% to 8% by weight.

The cemented tungsten carbide is commingled with single crystal WC, preferably in the range of from 40 to 80 mesh.

The ratio of particle size of the larger particles of cemented tungsten carbide to smaller monocrystalline carbide can be in the range of from two to five. A larger ratio is less desirable since the smaller particles can be so small that excessive solution in the alloy steel matrix may occur. A size ratio of three is preferred.

Another exemplary composition for hard facing teeth on a rock bit employs 80 to 200 mesh cemented tungsten carbide mixed with single crystal monotungsten carbide in the range of from 200 to 325 mesh. Generally speaking, the hard facing with larger particles is tougher and more resistant to breakage, whereas the smaller particles result in a more wear resistant hard facing.

The weight ratio of the larger particle size cemented tungsten carbide to the smaller particle size single crystal WC is in the range of from 35:65 to 80:20, and preferably in the range of from 60:40 to 80:20. In a particularly preferred embodiment, the proportion of larger size cemented tungsten carbide is 75% by weight and the smaller particle size single crystal WC is 25%. A substantial proportion of the cemented carbide is preferred for enhanced toughness of the hard facing.

The high packing density of the relatively larger cemented tungsten carbide particles and relatively smaller single crystal carbide particles is appropriate for resisting hypothesized wear mechanisms for hard facing material. One postulated wear mechanism comprises "extrusion" or yielding and consequent wear of the binder phase securing the carbide particles to the substrate. Wear of the matrix leaves carbide particles exposed and unsupported for possible fracture. One way of enhancing wear resistance of the binder is to make it stronger and harder. An alloy steel binder provides such hardness and strength while retaining sufficient toughness to keep the hard facing intact.

Another way of enhancing wear resistance of the binder is to reduce the mean distance between particles so that the binder layer is thinner. This can be done by having smaller particles, but this may diminish the cutting ability of the teeth on the cutter cone. The high packing density and high proportion of carbide to binder possible in the extruded rods also reduce the mean distance between particles or thickness of the binder phase which may be subject to deformation and wear.

Generally speaking, the proportion of carbide to steel in the hard facing should be maximized for best wear resistance. For example, the carbide should be in the range of from 60 to 80% of the composition with the steel forming the other 20 to 40%. A preferred range is from 70 to 75% carbide. This desideratum is promoted in the extruded rods since the proportion of matrix can be higher than with tube-rods, while still maintaining adequate strength for handling.

The particles of binder or matrix metal are preferably about ⅓ the size of the carbide particles. Exemplary particle size is in the order of 100 to 200 mesh, or even smaller.

The temporary organic binder can be any of a variety of compositions that can be vaporized from the mixture before sintering to avoid residual contamination. A variety of paraffin waxes may be used. Polyethylene glycol with a molecular weight of about 1,000 is appropriate. Other hydrocarbon lubricants conventionally used for pressing or extruding powder metallurgy mixtures can be used. Solvents such as hexane, heptane, or the like may also be incorporated in the composition for uniformity of mixing.

Conventional mixing techniques in a Hobart mixer, ball mill, or the like are quite suitable. Typically the mixing is conducted at an elevated temperature so that the organic binder is melted and contacts all surfaces of the powders to give the green compact reasonable strength. For example, a mixture using polyethylene glycol as the binder may be mixed at about 120° C. It is desirable to cool the mixture below 40° C. before extruding so that the polyethylene glycol is solid and a reasonable green strength is obtained in the rod.

The quantity of organic binder is not particularly critical. Something in the order of 2 to 5% binder is satisfactory. The amount used may depend on the particular binder chosen and the parameters of the extruding press.

Extrusion does not appear to have critical parameters. All that is required is sufficient pressure to obtain a straight rod. The diameter of the orifice on the extrusion machine determines the size of the completed rod. Thus a green rod extruded at a diameter of about 4.4 millimeters has a finished diameter of about 4 millimeters after sintering.

The best parameters for extruding a given mixture are somewhat a matter of trial and error. The composition of the mixture makes a difference. As suggested above, spherical particles tend to extrude easier than angular particles. Thus, the nature of the carbides employed may make a difference in the extrusion. Particle size may also have an influence, as well as the choice and concentration of lubricant. Other parameters subject to variation in the extrusion include pressure and temperature.

Routine experimentation can determine the appropriate parameters. If the mixture is too "stiff", it may not be feasible to extrude it at reasonable pressures. Conversely if the mixture is too "soft", the extruded rods may crack. It might be noted that minor surface cracks which do not affect their performance are sometimes seen on the rods.

The rod diameter and length are not critical, and any conventional dimensions are suitable. From four to ten millimeter diameter rods can easily be made and used. The rods need not be round, and flattened pads may also be pressed and sintered for forming hard facings.

The extruded and cut green rods are placed on a graphite tray in a vacuum furnace. With a steel matrix alloy the sintering temperature can be about 1050° C. to achieve a density of about 95% of theoretical density, appreciably less than 100% which would be obtained if the matrix were melted. Although such welding rods do not have a high degree of toughness, they are sufficiently strong to withstand dropping one-half meter or so onto a concrete surface.

It has previously been the practice to apply hard facing by melting the tube-rod in an oxyacetylene flame or the like. The steel tube melts and the carbide particles mix with the molten metal. Since the tube-rod is inherently non-homogeneous, the resultant hard facing may also be non-homogeneous in places where good mixing is not obtained.

For some reason, the tube-rod could not be successfully applied by tungsten inert gas (TIG) or metal inert gas (MIG) welding due to excessive solution of carbide particles in the matrix. This is probably due to the inherent non-uniformity of the composition which requires maintenance of a molten pool long enough for mixing to occur. The time at elevated temperature was apparently enough for appreciable amounts of the carbide to dissolve.

Surprisingly, the extruded and partially sintered hard facing rod can be applied to a surface by TIG welding without excessive solution. This is hypothesized to be due to a shorter interval at elevated temperature when the matrix is intimately commingled with the carbide in the rod, rather than being encased in a tube of the matrix metal. The commingled matrix is thought to melt more readily than the steel tube-rod, and there is less tendency to overheat. This means that the hard facing cools more quickly. Since the residence time of the carbide particles in molten matrix is thereby reduced, solution is also reduced.

Figure 4:
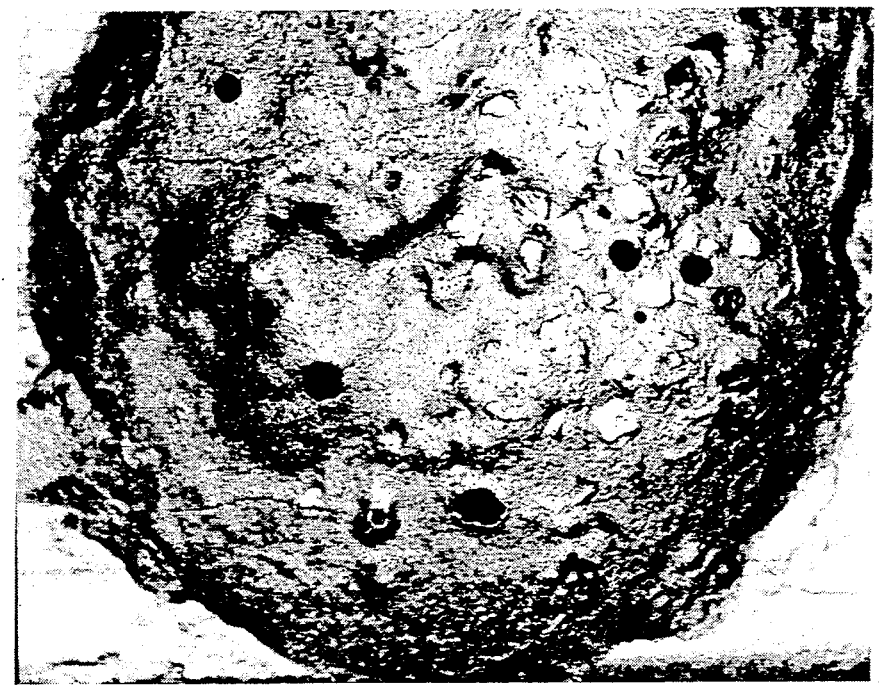
FIG. 4 is a photograph of the surface of a weld bead of hard facing applied by oxyacetylene flame.
Figure 5:
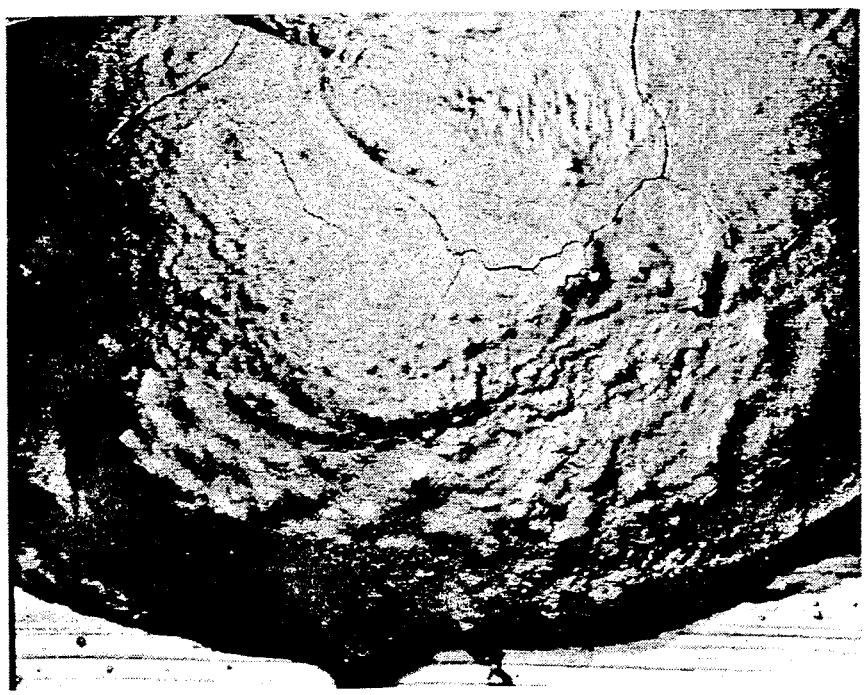
FIG. 5 is a photograph of the surface of a weld bead of hard facing applied by tungsten inert gas welding.

It is desirable to TIG weld the hard facing since this technique is more readily automated that oxyacetylene welding. Further, the weld quality obtained is usually superior. FIGS. 4 and 5 are photographs of the surfaces of weld beads of hard facing applied by oxyacetylene welding and TIG welding, respectively (enlarged 6.3X in the original). Although these surface qualities are not always obtained in the respective beads, they are not greatly atypical. The desirability of TIG welding without voids is apparent.

Figure 8:
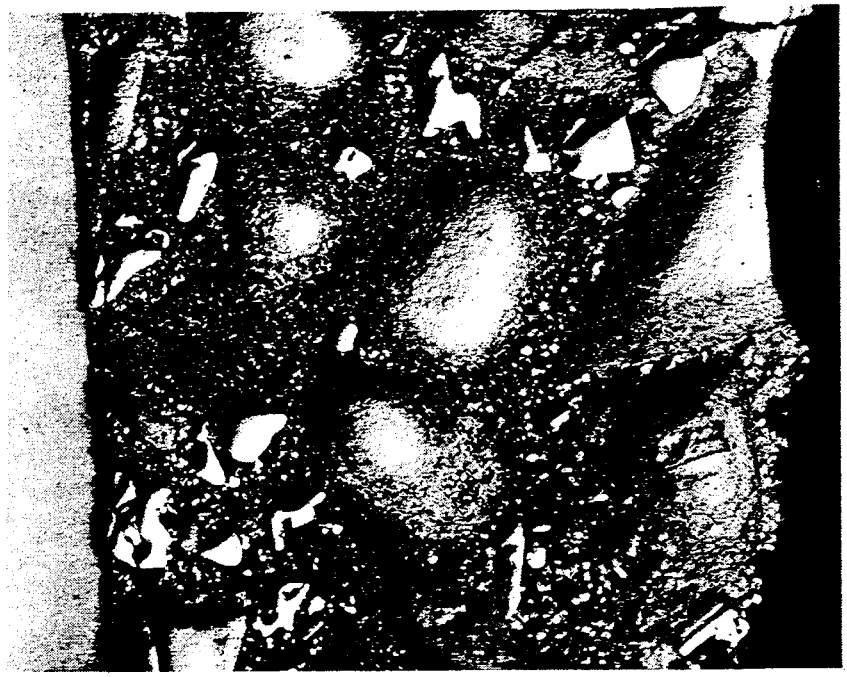
FIG. 8 is a photomicrograph of a hard facing applied from a prior art tube-rod by oxyacetylene welding.
Figure 9:
FIG. 9 is a photomicrograph of a hard facing applied from a prior art tube-rod by TIG welding.
Figure 6:
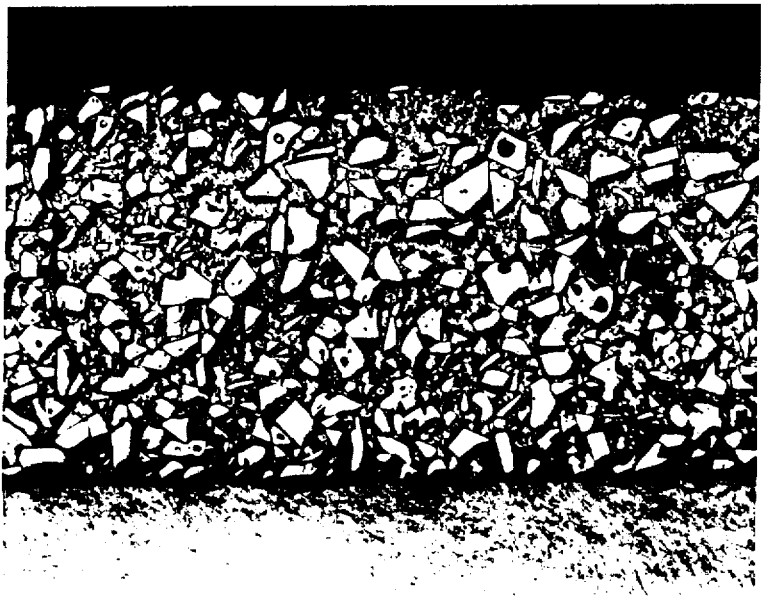
FIG. 6 is a photomicrograph of a hard facing applied from a prior art tube-rod by oxyacetylene welding.
Figure 7:
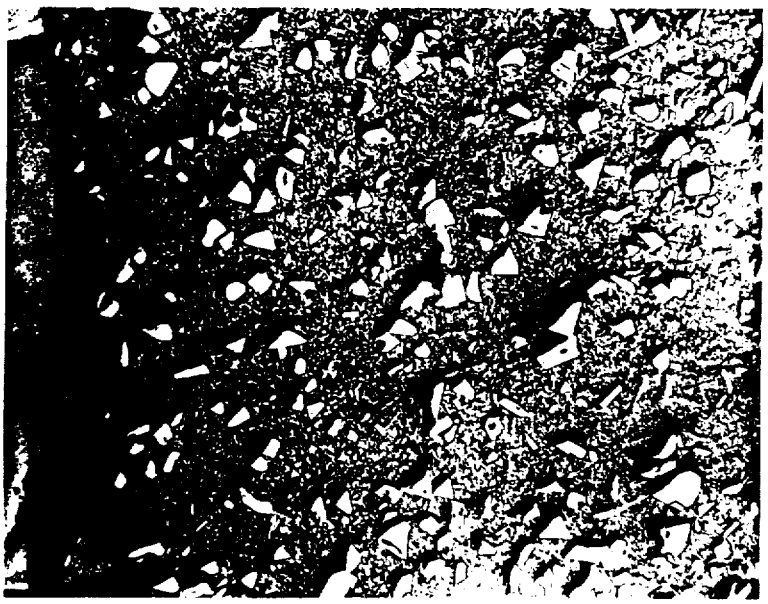
FIG. 7 is a photomicrograph of a hard facing applied from a prior art tube-rod by TIG welding.

FIGS. 6 and 8 are examples of hard facings applied by prior art tube-rods and oxyacetylene welding which is generally regarded as acceptable. FIGS. 7 and 9 are examples of hard facings applied from the same tube-rods as FIGS. 6 and 8 respectively, but by tungsten inert gas welding. The tube-rod used in the welds of FIGS. 6 and 7 contained 80 to 200 mesh macrocrystalline tungsten carbide particles. The tube-rod used in the welds of FIGS. 8 contained 9 contained 25% 40 to 80 mesh macrocrystalline tungsten carbide and 75% 20 to 30 mesh crushed cemented tungsten carbide. All of the photomicrographs are at 40X in the original application.

By comparing FIGS. 6 and 7 it can be seen that a substantial quantity of the carbide particles disappeared during TIG welding. It is believed that these dissolved in the alloy steel matrix.

In both of FIGS. 8 and 9 it ca be seen that there has been substantial dissolution of cemented tungsten carbide particles in the steel matrix. This is apparent from the severe rounding of the particles, and is particularly noticeable in the hard facing deposited by oxyacetylene welding. Such solution of the cemented carbide, including the fine tungsten carbide particles and the cobalt cementing phase, raises the alloy content of the matrix and tends to embrittle it. This is suggested by the TIG welded specimen which has cracks extending through the carbide particles as well as the matrix.

Figure 10:
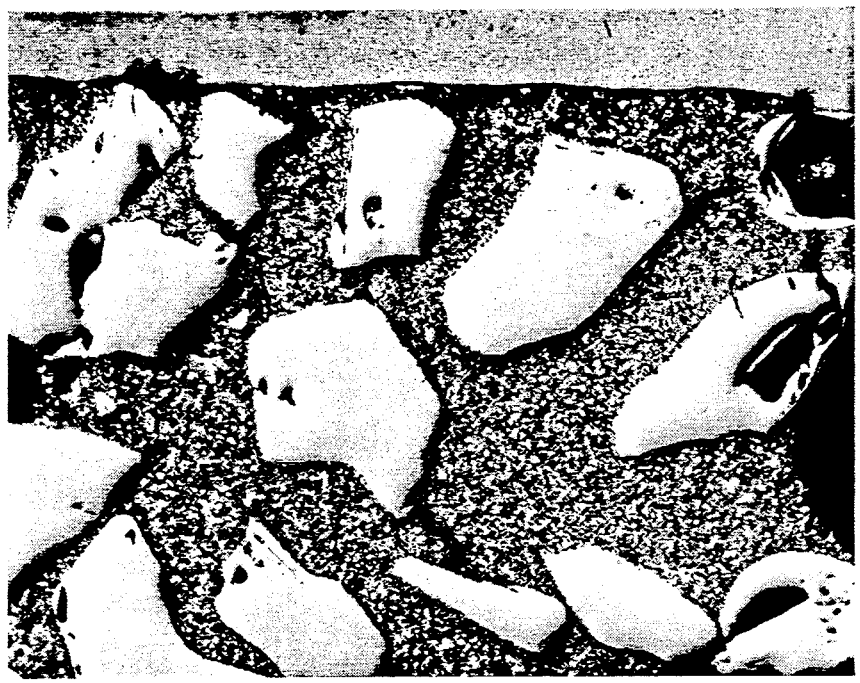
FIG. 10 is a photomicrograph of a hard facing applied from an extruded rod by oxyacetylene welding.
Figure 11:
FIG. 11 is a photomicrograph of a hard facing applied from an extruded rod by TIG welding.

FIGS. 10 and 11 are photomicrographs at 50X in the original application of hard facings deposited from an extruded and sintered rod as provided in practice of this invention. The rod contained 40 to 80 mesh macrocrystalline tungsten carbide. The hard facing in FIG. 10 was deposited by oxyacetylene welding, while the hard facing in FIG. 11 was deposited by TIG welding. No significant difference can be seen in these microstructures.

Although it is preferred to extrude the rods for ease and economy of manufacture, it is also feasible to press rod-shaped compacts in a hydraulic press in the same manner as compacts are pressed for making cemented tungsten carbide. A principal difference lies in the composition of the mixture and the deliberate avoidance of temperatures in the melting range of the matrix to avoid metallurgical reaction with the carbide embedded in the matrix. As used herein, "pressing" refers to either pressing in a die or extrusion under pressure.

In a specific example of a hard facing provided in practice of this invention, a mixture was made of 66.5 tungsten carbide particles, 3.5% silico-manganese particles, and 30% by weight of 200 mesh plain carbon steel particles. The tungsten carbide particles comprise 50% macrocrystalline monotungsten carbide in the range of from 40 to 60 mesh and 50% macrocrystalline monotungsten carbide in the range of 20 to 30 mesh.

The metal and carbide particles were mixed with 3.7% of polyethylene glycol having a molecular weight of about 1,000 and 1.8% Protepet 1E, a hydrocarbon lubricant available from Witco Chemical Co., New York, N.Y. Heptane was included for dissolving the organics and aiding mixing. The composition was mixed in a Hobart mixer at about 120° C. After thorough mixing, it was cooled to less than 40° C. and extruded with just enough pressure to get straight rod 4.4 millimeters in diameter.

Such rods were laid on graphite trays and heated at 20° C. per minute to about 950° C. while pumping down a vacuum furnace. They were then heated at 5° C. per minute to 1070° C. and were held for 45 minutes at 1070° C. The furnace was cooled to 660° C. in vacuum and then backfilled with argon to expedite cooling. After this sintering treatment the rods had shrunk to a diameter of about 4 millimeters and had a residual porosity of less than 5%.

In another example a mixture was made of 66.5% by weight tungsten carbide particles, 3.5% by weight silico-manganese particles, and 30% by weight particles of brazing alloy BNi2. The tungsten carbide particles comprised 50% by weight macrocrystalline monotungsten carbide in the range of from 40 to 60 mesh and 50% crushed cemented carbide particles in the range of from 20 to 30 mesh. The composition was thoroughly mixed with 3.5% paraffin wax and pressed in a closed die to form rods having a diameter of about 4.4 millimeters.

Sintering was similar in a vacuum furnace, except that the maximum temperature was about 600° C.

The rods were successfully tested by applying hard facing to teeth of a cutter cone for a rock bit.

Other modifications and variations of hard facing rods will be apparent to one skilled in the art. For example, other matrix compositions such as a mixture of brazing alloy and steel particles inappropriate for tube-rods may be fabricated by the powder metallurgy techniques described herein. It is, therefore, to be understood that within the scope of the appended claims, this invention may be practiced otherwise than as specifically described.

What is claimed is:

1. A rod for applying hardfacing to a surface comprising:
   particles of tungsten carbide; and
   a matrix of metal particles selected from the group consisting of low carbon steel and alloy steel, sufficiently sintered together to bind the tungsten carbide particles into a rigid rod, but sintered at less than the melting temperature of the metal.

2. A rod as recited in claim 1 wherein the tungsten carbide particles are selected from the group consisting of cemented tungsten carbide, single crystal monotungsten carbide, and cast tungsten carbide.

3. A rod for applying hardfacing to a surface comprising:
   a mixture of cemented tungsten carbide particles and single crystal monotungsten carbide particles; and
   a matrix of metal particles sufficiently sintered together to bind the tungsten carbide particles into a rigid rod, but sintered at less than the melting temperature of the metal.

4. A rod as recited in claim 1 wherein the particle size of the cemented tungsten carbide particles is from two to five times larger than the particle size of the single crystal monotungsten carbide particles.

5. A rod as recited in claim 1 wherein the tungsten carbide particles are approximately spherical.

6. A rod for applying hardfacing to a surface comprising:
   particles of tungsten carbide; and
   a matrix of metal particles sufficiently sintered together to bind the tungsten carbide particles into a rigid rod having residual porosity in the range of from five to twenty percent.

7. A rod as recited in claim 1 wherein the metal particles comprise an alloy steel.

8. A rod as recited in claim 1 wherein the tungsten carbide particles are selected from the group consisting of cemented tungsten carbide, single crystal monotungsten carbide, and cast tungsten carbide.

9. A rod as recited in claim 1 wherein the tungsten carbide particles are approximately spherical.

* * * * *

UNITED STATES PATENT AND TRADEMARK OFFICE
CERTIFICATE OF CORRECTION

PATENT NO. : 5,051,112

DATED : September 24, 1991

INVENTOR(S) : Madapusi K. Keshavan; Proserfina C. Rey

It is certified that error appears in the above-identified patent and that said Letters Patent is hereby corrected as shown below:

FIGS. 6 and 7 of the dawings should be included per the attached copy of the drawings.

Column 1, line 8, change "07/212/867" to -- 07/212,867 --.
Column 8, line 50, change "FIGS. 8 contained 9" to
        -- FIGS. 8 and 9 --.
Column 8, line 58, after "it" change "ca" to -- can --.

Signed and Sealed this

Ninth Day of March, 1993

Attest:

STEPHEN G. KUNIN

Attesting Officer

Acting Commissioner of Patents and Trademarks

PRIOR ART MATERIAL

PRIOR ART MATERIAL